March 8, 1966  H. C. HILL  3,238,718

GAS TURBINE ENGINE

Filed Jan. 30, 1964  2 Sheets-Sheet 1

INVENTOR.
HENRY C. HILL
BY
Reynolds + Christensen
ATTORNEYS

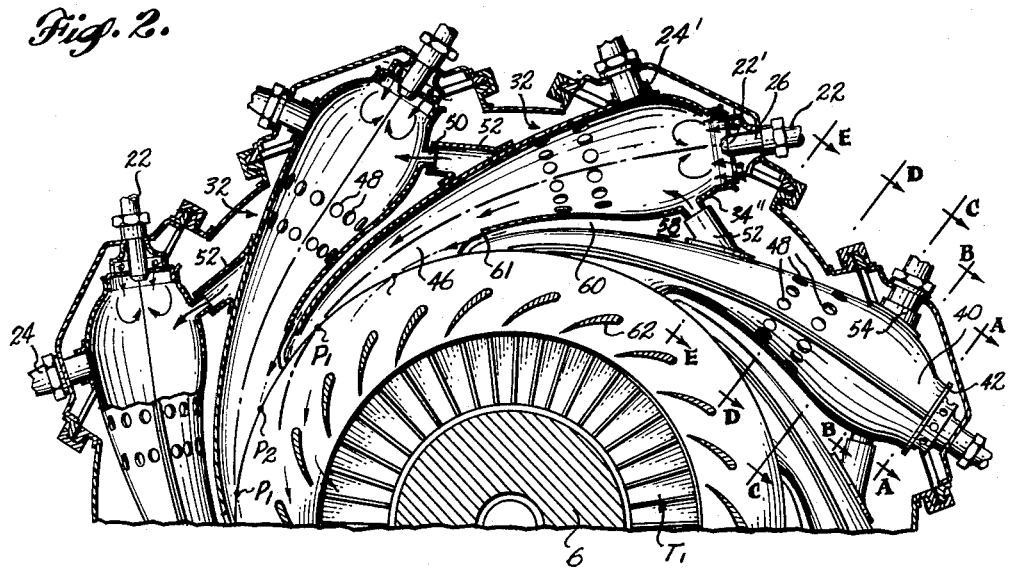

United States Patent Office 3,238,718
Patented Mar. 8, 1966

3,238,718
GAS TURBINE ENGINE
Henry C. Hill, Seattle, Wash., assignor to The Boeing
Company, Seattle, Wash., a corporation of Delaware
Filed Jan. 30, 1964, Ser. No. 341,233
25 Claims. (Cl. 60—39.37)

This invention relates to heat engines and more particularly to gas turbine engines.

A conventional gas turbine engine comprises three sections: a compressor section; a combustor section; and the turbine section. In the compressor section kinetic energy is imparted to an air stream and thence transformed in a diffusor into potential energy as measured by an increase in static pressure in the compressor. The combustor section receives the compressed air from the compressor section and raises its temperature by combustion of fuel, ideally at constant pressure. The heated product of the combustion section is then expanded through an injector nozzle into the turbine section where it operates to drive the turbine wheel. The present invention is principally concerned with the combustor section but is characterized with features and advantages which affect all three sections of the engine. Certain of these will be discussed before two embodiments of the invention are described in detail to illustrate its underlying structure.

Complete combustion, minimum pressure loss, absence of deposits, rapid and reliable ignition, controlled temperature and velocity distribution at the turbine inlet, and reliability and endurance are all major criteria for the performance of the combustor section. In certain applications, such as where the engine is used to power an aircraft, volume, weight and compactness are also critical. A principal object of the present invention is to provide an arrangement within the combustor section which has added compactness and reduced volume and weight as compared with earlier versions of the gas turbine engine. It also includes related objects affecting the other criteria as will become apparent.

Control of the turbine inlet temperature and engine compactness are factors which are not easily reconciled. A high combustion heat is sought in the primary combustion zone yet before they reach the turbine inlet, the products of combustion must experience a sharp temperature drop lest they will damage the turbine blades. To effect this drop a path of some considerable length between the primary combustion zone and the turbine inlet, i.e. nozzle, is needed together with a means for rapidly cooling the combustion products. To achieve the optimum effect, the path taken by the combustion products and the cooling means acting on them must not result in an appreciable energy loss and must in no way tend to quench the flame issuing from the primary combustion zone. It is also important that no localized overheating occurs. Understandably these factors are not easily satisfied within a compact combustor arrangement. It is another important object of the invention, nevertheless, to achieve these results within a highly compact combustor arrangement.

A conventional turbine section in a gas turbine engine may employ either an axial inflow turbomachine or a radial inflow turbomachine. The latter is capable of utilizing a higher pressure than the former for a single set of moving blades and thus is often a simpler unit to use. Its use has been largely limited to small sized engines, however, due to problems of flow handling, and has been severely limited in aircraft applications because of the problem of incorporating the necessary path length and cooling means without unduly enlarging the diameter and/or the length of the engine. It is a still further object of the invention to provide a highly compact combustor arrangement which can be used with either an axial inflow or a radial inflow turbine wheel and which is preferably used with the latter.

The products of combustion are, of course, largely gaseous. The common technique for cooling the gases is to reserve part of the compressed air flow for introduction into them at points intermediate the primary combustion zone and the turbine inlet. This reserve air is commonly spoken of as the secondary air and to be effective, must be thoroughly and uniformly mixed with the gases without causing undue turbulence. The present invention employs this cooling technique with the further object of mixing the secondary air with the combustion gases within a highly compact low weight combustor arrangement which avoids or minimizes energy losses resulting from undue turbulence in the mixing process.

Other and related objects include providing a combustor arrangement which can be fed by a compressed air flow split among several diffusor pipes interconnecting it with the compressor section; and one which can be cheaply and easily fabricated with stamped or cast combustors that readily disassemble on an individual basis from the engine for servicing or replacement, and which are loosely engaged so as to allow for cooling and for thermal expansion and contraction in use.

Conventional combustors commonly have a tubular form. One end of the tube (or liner) is employed as the reaction or primary combustion zone and is ordinarily equipped with an end baffle to establish a recirculation zone to assist in stabilizing the reaction and in promoting mixing action between the fuel, compressed air, and burnt gases. The other end of the tube is open and operates as the discharge for the products of combustion. The tube is surrounded by an outer air casing which is spaced to leave an annular passage about the tube serving not only to separate the required primary air for the combustion zone from the total air, but also to provide a moving jacket of secondary air which controls the temperature of the tube. The secondary air is admitted progressively through holes or slots in the tube with usually a small gap being left between the discharge end of the tube and the air casing to provide a film of cool air for the final contraction to the injector nozzle entry adjacent such end.

This typical form of combustor with the cylindrical tube in a surrounding air casing is commonly called a "can" combustor. It can be adapted to a single annular chamber, and to a number of tube combustors in a single annular casing. The former is commonly called an annular combustor and is equipped with multiple fuel injectors arranged in a circle. The latter is spoken of as a can-annular arrangement or as a cannular combustor.

The present invention is directed to a form of cannular combustor in which the tube combustors are uniquely shaped, mounted, and oriented within an annular compressed-air-filled plenum chamber which is disposed about the injector nozzle and equipped with an annular trough around the inner periphery thereof. The combustors have an angularly spaced relationship about the trough with their open discharge ends arranged to discharge into the trough along tangents to a first set of points therein positioned at angular intervals about the nozzle, there being a corresponding series of coolant air nozzles formed in the spaces between the combustors with their discharge openings arranged to discharge into the trough along tangents to a second set of points therein positioned angularly intermediate the first set of points. The discharges of the combustors and the air nozzles have a common direction of rotation about the trough and therefore interweave to form a low temperature gas annulus or vortex therein which has a swirling motion about the nozzle.

This swirling motion gives the combustion gases an added opportunity to mix with the secondary coolant air in the trough before the resultant mix plunges inwardly through the nozzle and acts on the turbine wheel. Because of this added opportunity, the path length of the tube combustors can be considerably shortened and the number of holes or slots for air flow in their sides can be reduced or eliminated since there is no special reliance on a large cooling effect within the combustors themselves. Moreover, the combustors can be arcuate in length so as to be more readily adaptable to closely compact arrangements of them in the chamber. These arrangements, in turn, have the effect of reducing the diameter of the chamber and thus of reducing the size of the engine itself. It is also contemplated that the injector nozzle can function as a continuous nozzle, that is, without the customary fixed blades or vanes.

A particularly satisfactory form to be illustrated features arcuate combustors which are mounted in the spandrels defined between the trough and the tangents along which they discharge into the trough, the open discharge end of each combustor being inserted in the meniscus defined between the trough and the combustor next succeeding it in the direction of rotation of the annulus. This form also has certain additional features which make it readily serviceable without any major disassembly of the engine. For the purposes of its description reference should be made to the accompanying drawings wherein:

FIGURE 2 is a radial cross section of the upper half of the engine in the plane 2—2 of FIGURE 1, with certain of the combustors shown in full and others shown in section;

FIGURE 3 is an enlarged view through the upper half of the combustor section in FIGURE 1;

FIGURE 5 is a series of cross sections through the tube combustor taken in the planes A—A, B—B, C—C, D—D, and E—E of FIGURE 2.

Figures 1, 4, 6:
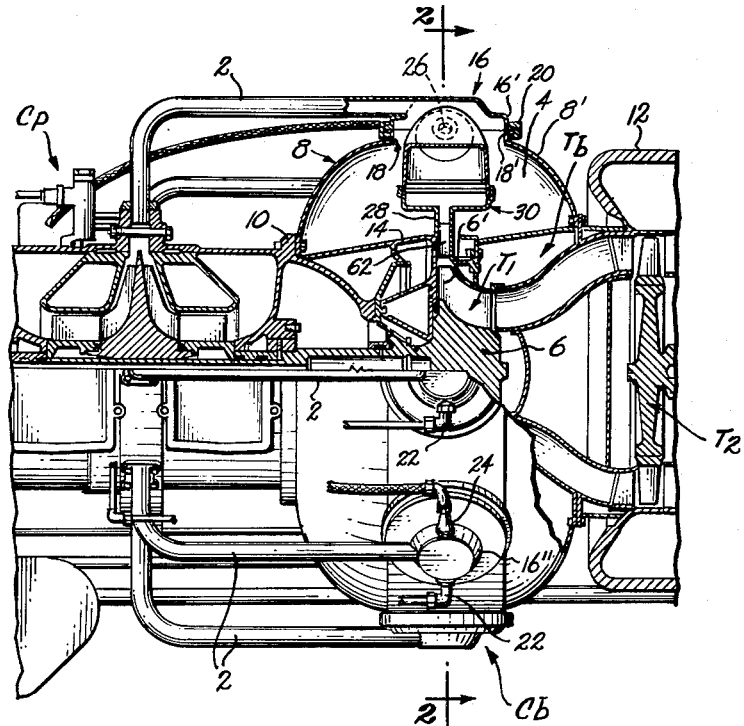
FIGURE 1 is a part longitudinal cross sectional view through the combustor and turbomachine sections of a gas turbine engine incorporating a radial inflow version of this form.
FIGURE 4 is an isometric view of one of the tube combustors used in the combustor section (Sheet 1)
FIGURE 6 is a view comparable to FIGURE 3 but of an axial-inflow version of the illustrated form (Sheet 1).

The engine of FIGURE 1 includes a compressor section $C_p$, a combustor section $C_b$, and a turbine section $T_b$, there being two stages T1 and T2 in the turbine section. The compressor and turbine sections are largely conventional and it should be sufficient in regard to the former to point out that the compressed air discharged into the diffusor pipes 2 from the turbomachine element of the compressor is conveyed through each of the pipes to a plenum chamber 4 disposed annularly about the turbine wheel 6 of the first stage turbine T1. The chamber 4 is radially outwardly defined by an annular casing 8 wrapped about the turbine enclosure and bolted to the engine frame 10 at points axially forward and rearward of the turbine wheel 6. If desired the casing can be extended rearwardly about the exhaust eductor 12 to support the reduction gearing (not shown) aft of the second stage turbine T2. This would lengthen the chamber and would also lend itself to greater streamlining of the engine and to the provision of exhaust eductor oil cooling. However, in the illustrated embodiment the casing is bolted forwardly of the eductor and dressed with sloping sidewalls 8' which give the plenum chamber a trapezoidal cross-section about the inner casing 14 forming the turbine enclosure.

In accord with the invention, the aft end of each diffusor 2 is outfitted with an elbow cap 16 which has a flanged skirt 16' around its radially inwardly facing opening. The caps 16 overlie ports 18 spaced equiangularly around the circumference of the chamber casing, and fit down over the flanged rims 18' of the ports, there being a channel ring 20 used to clamp each cap over its port. In addition to funneling the compressed air discharge into the chamber 4, the port caps 16 also act as mounts for combustor domes 22 of the conventional air-swirler type, and for fuel igniters 24 of the conventional spark or dummy type, which are inserted and fixed in diametrically-opposing holes 26 in the sloping side walls 16" of the caps. The holes 26 are coincident with the radial plane 2—2 of the turbine wheel 6 and present the rounded fuel injector heads 22' of the domes and the hot faces 24' of the plugs to the interior of the chamber along chords which cross one another in the plane at roughly 90°.

The upper radial section made by this plane is seen in FIGURE 2. Viewing FIGURES 1 and 2 together, it will be seen that the turbine wheel 6 is equipped with a set of moving blades 6' which are exposed radially outwardly of the turbine enclosure to an annular injector nozzle ring 28 furnishing the inlet to the turbine T1 from the chamber. The nozzle ring opens into an annular channel or trough 30 which is fixed in a relatievly coaxial position about the wheel coincident with the radial plane and with its walls 30' flaring out in each of the axial directions so that it is considerably broader than the nozzle ring 28 and takes on a pan configuration in cross section. The trough 30 acts as a nest or basket for a series of snail-shaped tube combustors 32 which are stationed about it in the chamber.

The shell configuration of an individual combustor can be seen in FIGURES 4 and 5. In general the shell 34 is characterized with a bulbous head section 36 and a laterally flared and longitudinally arched body section 38. The mouth 40 of its head section converges to a lipped muzzle 42 adapted for loose engagement over the injector head 22' of one of the domes, while the open tail 44 of its body section is adapted to slip loosely between walls 30' of the trough. Intermediate the two, the cross section of the shell becomes progressively more oblate in the vertical plane and more prolate in the horizontal plane as the rearward course of its longitudinal axis is curved gradually in the ventral direction. See the cross-sectional cuts made of the shell in FIGURE 5. Note also that the tail of its body section is truncated in a horizontal plane substantially parallel to the course of its axis in the head section so that the tail is thus left with a scooped mouth 46 which opens in the ventral direction.

The shell also has two bands of perforations 48 about its waist and three nipples 50, 52, 54 on its dorsal and ventral walls 34' and 34". Two of the nipples, 50 and 52 are sized to fit within one another, as between pairs of the combustors, and are positioned along the length of the shell to open into its head section 36 in one instance and into its body section 38 in the other, the former being located in the ventral wall 34" of the shell and the latter in its dorsal wall 34'. The third nipple 54 is also located in its dorsal wall but so as to open into the head section 36 where it can receive the head 24' of one of the fuel igniters.

At the time of assembly each combustor 32 is suspended from a cap 16 by first engaging its muzzle 42 over the cap's dome 22 and then inserting the cap's fuel igniter 24 into its dorsal head nipple 54. Thereafter the combustor is inserted into the chamber relatively tangentially of the trough until the side walls of its tail come to rest on a pair of shoulders 56 running along the walls 30' of the trough. Because of the length of the combustor, the cap comes to rest over the rim 18' of the port at much the same time. Clamping the cap to the port now serves not only to close the port but also to mount the combustor in the chamber in the desired orientation. As each successive combustor is introduced into the chamber, its dorsal body nipple 52 is passed over the ventral head nipple 50 of the next preceding combustor so that the two combustors are interconnected through their nipples.

The upper half of the final assembly is seen in FIGURE 2. Note that although the combustors are adequately supported and positioned in the chamber they make only a loose slip fit with one another at the nipples 50, 52 and with each of the domes, fuel igniters, and the trough. Consequently, the maximum surface area of the combustors is exposed to the cooling overflow of the secondary air and there is adequate leeway between all mating surfaces to allow for contraction and expansion due to thermal stresses. Note also that the loose telescopic engagement made between the nipples 50, 52 is such so that any one combustor can be removed from within the arrangement by lifting its port cap, first slightly counterclockwise of FIGURE 2 to clear its ventral head nipple 50 and thence tangentially outwardly of the chamber as its dorsal body nipple 52 clears the next preceding combustor in the counterclockwise direction.

The operation of the combustor section follows the broader description given earlier. Each combustor head becomes a combustion chamber for the primary reaction, the air for such being admitted through both the adjacent air-swirler dome and the gap between the dome and the muzzle of the combustor, and having a sufficient tangential component to produce a reverse flow "donut-type" pattern of primary combustion products. Downstream of the primary reaction, the combustion products are constrained to follow the curvilinear path of the combustor body and are eventually spread into a wide sheet-like stream which arches into a tangential course toward a point P1 on the periphery of the trough 30. As the sheet begins to take form in the waist of the body, it is infused with cool secondary air entering through the perforations 48. A more significant cooling effect takes place in the mouth 46 of the body's tail, however. In the arrangement each of the combustors in effect defines a meniscus 58 between its ventral wall and the periphery of the trough. The next succeeding combustor in the clockwise direction has its tail inserted into this meniscus but due to spacing of the caps from on another, its tail does not close with the first combustor and a converging concavo-convex nozzle-like clearance 60 is left between the ventral wall of one and the dorsal wall of the other. The rectangularly cross-sectional slot 61 between the trailing edges of the walls provides the nozzle opening. Like the bodies of the combustors, the nozzles 60 arch into tangents to points P2 on the periphery of the trough, which points, however, are angularly intermediate the points of tangency for the combustors. Consequently, a series of relatively inclined alternate combustor and nozzle discharges is developed in the counterclockwise direction around the trough. The nozzle discharges have a shear path across the combustor discharges, causing the two discharges to interweave with one another and to take on a rotational component in the counterclockwise direction about the trough. Mixing continues in this direction as the combined discharges become part of a low temperature gas vortex or annulus moving in the counterclockwise direction about the nozzle ring. The nozzle ring is equipped in turn with fixed blades or vanes 62 which are similarly angled to feed the annulus inwardly of the moving blades of the turbine wheel. As compared with earlier nozzle rings the fixed blades of the present nozzle ring are considerably shortened and function principally to form the annulus into a plurality of jets, the function of giving the jets the proper direction having been developed in the swirling action of the annulus. As earlier indicated it is contemplated that the fixed blades may be omitted altogether in certain applications.

Should there be a flame-out in one of the combustors, the low pressure in its primary zone will induce cross firing through the nipples 50, 52 from the higher pressure secondary mixing zone of the next succeeding combustor.

The described arrangement can be readily adapted to an axial inflow version of the engine by employing a trough 64, the injector nozzle 66 of which discharges laterally of the trough as seen in FIGURE 6. The modified arrangement functions in the same manner as the described radial inflow version but with a slightly lowered efficiency because of turn losses. For this reason the radial inflow version is presently preferred.

The trough and injector nozzle of each version can be fashioned as an integral casting or can be fabricated as separate members. Similarly each of the combustors can be integrally cast or fashioned from a pair of relatively overlaid stamped components joined by side seams, as in the drawings.

The diffusor pipes are shown as integral with the port caps. It may be more desirable to construct them as separate elements and to join them by couplings or flexible joints which enable the combustors to be removed without disturbing the diffusor pipes.

There are, of course, numerous other changes, substitutions, and additions which can also be made in the described form without departing from the spirit of the invention as defined in the claims following.

I claim as my invention:

1. In a gas turbine engine, the combination of a turbine wheel, means defining an annular injector nozzle which is fixed in a relatively coaxial position adjacent the wheel, and an annular plenum chamber which is disposed about the nozzle and has an annular trough around the inner periphery thereof which connects the interior of the chamber with the nozzle, means supplying compressed air to the chamber, and combustor means for the air comprising a series of tube combustors which are formed in the chamber in angularly spaced relationship about the trough with their open discharge ends arranged to discharge into the trough along tangents to a first set of points therein positioned at angular intervals about the nozzle, there being a corresponding series of coolant air nozzles formed in the spaces between the combustors with their discharge openings arranged to discharge into the trough along tangents to a second set of points therein positioned angularly intermediate the first set of points, which discharges of the combustors and air nozzles have a common direction of rotation about the trough so that they interweave to form a low temperature gas annulus therein having a swirling motion about the injector nozzle.

2. A gas turbine engine according to claim 1 wherein the air nozzles are formed by the mutually opposing walls of the combustors and their discharge openings by the trailing edges of such walls.

3. A gas turbine engine according to claim 1, wherein the air nozzles are arcuate in length.

4. A gas turbine engine according to claim 3 wherein the air nozzles extend in the direction of rotation of the annulus toward the second set of points along curvilinear longitudinal axes originating in the spandrels defined between the trough and the tangents to such second set of points.

5. A gas turbine engine according to claim 4 wherein the axes of the air nozzles are coincident with a radial plane of the trough.

6. A gas turbine engine according to claim 5 wherein the plane of the trough is coplanar with the turbine wheel.

7. A gas turbine engine according to claim 4 wherein the second set of points lie in the openings of the discharge ends of the combustors.

8. A gas turbine engine according to claim 4 wherein the air nozzles have a converging concavo-convex cross-sectional configuration along their axes.

9. A gas turbine engine according to claim 1 wherein the tube combustors are formed in the chamber by a series of individual tubes which are separately mounted in angularly spaced relationship about the trough.

10. A gas turbine engine according to claim 9 wherein the outer periphery of the chamber is defined by an annular casing and the tubes are suspended from the casing so as to make a loose slip fit with the trough.

11. A gas turbine engine according to claim 10 wherein the casing is ported at angularly spaced points on its circumference and the tubes are engaged and supported on caps removably secured over the ports.

12. A gas turbine engine according to claim 11 wherein the caps are connected with the compressed air supply means by diffusor pipes.

13. A gas turbine engine according to claim 11 wherein the caps are equipped with angularly offset fuel injector and ignitor means and the tubes are engaged with such injector and ignitor means so as to be suspended from the caps.

14. A gas turbine engine according to claim 9 wherein the tubes are interconnected by cross-fire nipples.

15. A gas turbine engine according to claim 9 wherein the tubes have a shell configuration characterized with a bulbous head section and a laterally flared, longitudinally arcuate body section.

16. A gas turbine engine according to claim 1 wherein the walls of the trough are flared with respect to the nozzle so as to give it a pan configuration in cross section.

17. A gas turbine engine according to claim 1 wherein the injector nozzle is radially aligned with the turbine wheel.

18. A gas turbine engine according to claim 1 wherein the injector nozzle is axially aligned with the turbine wheel.

19. A gas turbine engine according to claim 1 wherein the injector nozzle has a series of vanes fixed therein so as to form a nozzle ring.

20. In a gas turbine engine, the combination of a turbine wheel, means defining an annular injector nozzle which is fixed in a relatively coaxial position adjacent the wheel, and an annular plenum chamber which is disposed about the nozzle and has an annular trough around the inner periphery thereof which connects the interior of the chamber with the nozzle, means supplying compressed air to the chamber, combustor means for the air which form a gas annulus in the trough, and a series of coolant air nozzles operating to control the temperature of the annulus, which air nozzles are formed in the chamber about the trough with their discharge openings arranged to discharge into the trough along tangents to a set of points positioned in the trough at angular intervals about the nozzle so that the annulus has a swirling motion in one direction of rotation about the trough.

21. In a gas turbine engine, the combination of a turbine wheel, means defining an annular injector nozzle which is fixed in a relatively coaxial position adjacent the wheel, and an annular plenum chamber which is disposed about the nozzle and has an annular trough around the inner periphery thereof which connects the interior of the chamber with the nozzle, means supplying compressed air to the chamber, combustor means for the air comprising a series of tube combustors which form a gas annulus in the trough, and coolant air nozzle means operating to control the temperature of the annulus, which tube combustors are formed in the chamber about the trough with their open discharge ends arranged to discharge into the trough along tangents to a set of points positioned in the trough at angular intervals about the injector nozzle so that the annulus has a swirling motion in one direction of rotation about the trough.

22. A gas turbine engine according to claim 21 wherein the open discharge ends of the tube combustors are arcuate in length.

23. A gas turbine engine according to claim 22 wherein the tube combustors are disposed in angularly spaced relationship about the trough and their open discharge ends extend in the direction of rotation of the annulus towards the set of points along curvilinear longitudinal axes originating in the spandrels defined between the trough and the tangents to such set of points.

24. A gas turbine engine according to claim 23 wherein the axes of the tube combustors are coincident with a radial plane of the trough.

25. A gas turbine engine according to claim 24 wherein the open discharge ends of the tube combustors have a converging concavo-convex cross-sectional configuration along their axes.

References Cited by the Examiner

UNITED STATES PATENTS

| | | | |
|---|---|---|---|
| 2,446,847 | 8/1948 | Osborne | 60—39.73 |
| 2,532,831 | 12/1950 | Breese | 60—39.73 X |
| 2,631,430 | 3/1953 | Staley | 60—39.37 |
| 2,661,594 | 12/1953 | Petrie | 60—39.37 |
| 2,895,295 | 7/1959 | Carlson | 60—39.37 X |
| 2,933,895 | 4/1960 | Cheeseman | 60—39.69 |
| 3,001,366 | 9/1961 | Shutts | 60—39.82 |
| 3,010,281 | 11/1961 | Cervenka | 60—39.37 |
| 3,029,602 | 4/1962 | Allen | 60—39.69 |
| 3,048,015 | 8/1962 | Barrelle | 60—39.82 |

MARK NEWMAN, *Primary Examiner.*

RALPH D. BLAKESLEE, *Examiner.*